(12) United States Patent  (10) Patent No.: US 8,638,082 B2
Miyamae  (45) Date of Patent: Jan. 28, 2014

(54) CONTROL CIRCUIT FOR STEP-DOWN AND BOOST TYPE SWITCHING SUPPLY CIRCUIT AND METHOD FOR SWITCHING SUPPLY CIRCUIT

(75) Inventor: Toru Miyamae, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 230 days.

(21) Appl. No.: 13/008,374

(22) Filed: Jan. 18, 2011

(65) Prior Publication Data

US 2011/0175588 A1  Jul. 21, 2011

(30) Foreign Application Priority Data

Jan. 19, 2010 (JP) ................... 2010-008880

(51) Int. Cl.
G05F 1/12 (2006.01)
(52) U.S. Cl.
USPC ............................ 323/284; 323/285; 323/287
(58) Field of Classification Search
USPC ........................ 323/282, 284–287
See application file for complete search history.

(56) References Cited

U.S. PATENT DOCUMENTS

| 7,116,085 | B2 * | 10/2006 | Ikezawa | 323/225 |
| 2008/0079405 | A1 * | 4/2008 | Shimizu | 323/282 |
| 2008/0252276 | A1 * | 10/2008 | Omet et al. | 323/282 |
| 2009/0108823 | A1 * | 4/2009 | Ho et al. | 323/282 |
| 2010/0007316 | A1 * | 1/2010 | Miller et al. | 323/282 |

FOREIGN PATENT DOCUMENTS

JP  2005-192312 A  7/2005

* cited by examiner

*Primary Examiner* — Adolf Berhane
*Assistant Examiner* — Gary Nash
(74) *Attorney, Agent, or Firm* — Sterne, Kessler, Goldstein & Fox P.L.L.C.

(57) ABSTRACT

A control circuit for a switching supply, include: a first control circuit that selects one of a first signal to switch a boost mode and a step-down mode and a second signal to control an on-period of a switch based on an input voltage, the switch provided between a terminal to which the input voltage is applied and an inductor; and a second control circuit that controls the switching supply based on an output voltage and the selected one of the first signal and the second signal.

9 Claims, 14 Drawing Sheets

US 8,638,082 B2

1

CONTROL CIRCUIT FOR STEP-DOWN AND BOOST TYPE SWITCHING SUPPLY CIRCUIT AND METHOD FOR SWITCHING SUPPLY CIRCUIT

CROSS-REFERENCE TO RELATED APPLICATIONS

This application claims the benefit of priority from Japanese Patent Application No. 2010-8880 filed on Jan. 19, 2010, the entire contents of which are incorporated herein by reference.

BACKGROUND

1. Field

Embodiments discussed herein relate to a control circuit for a switching supply, the switching supply, and a control method of the switching supply.

2. Description of Related Art

A switching supply circuit including a semiconductor switching element outputs a constant voltage based on a supplied DC input voltage. An electric device driven by a battery or the like may include a step-down and boost type switching supply circuit that outputs a constant output voltage without depending on an input voltage.

A step-down and boost DC/DC converter including a choke coil coupled in series or parallel to a voltage output terminal has two states which are repeated alternately based on ON/OFF of a switching element. Energy is accumulated in the choke coil from an input side in the one state, and the energy is discharged from the choke coil to an output side in the other state.

A related art is disclosed in Japanese Laid-open Patent Publication No. 2005-192312 or the like.

SUMMARY

According to one aspect of the embodiments, a control circuit for a switching supply, includes: a first control circuit that selects one of a first signal to switch a boost mode and a step-down mode and a second signal to control an on-period of a switch based on an input voltage, the switch provided between a terminal to which the input voltage is applied and an inductor; and a second control circuit that controls the switching supply based on an output voltage and the selected one of the first signal and the second signal.

The object and advantages of the invention will be realized and attained by means of at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

In a switching supply circuit, an ON period of a switching element may depend on a response time of a circuit that outputs a signal for controlling the switching element, for example, a comparator.

Figure 1:
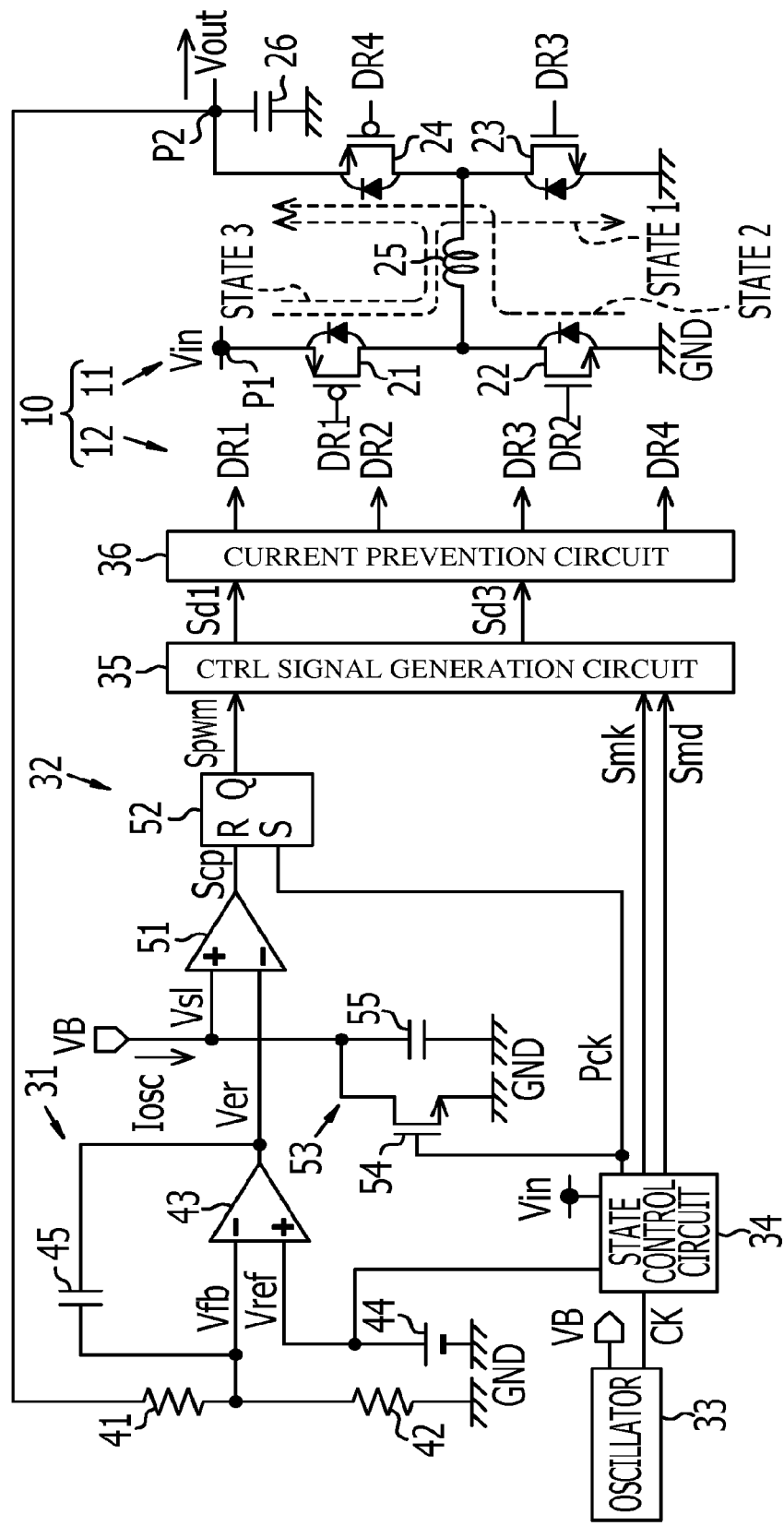
FIG. 1 illustrates an exemplary step-down and boost type switching supply.

FIG. 1 illustrates an exemplary step-down and boost type switching supply. A step-down and boost type switching supply 10 includes an output unit 11 and a control unit 12.

The output unit 11 includes four transistors 21 to 24, an inductor 25, and a capacitor 26. For example, the first transistor 21 and the fourth transistor 24 may be a P-channel MOS transistor, and the second transistor 22 and the third transistor 23 may be an N-channel MOS transistor. A source of the first transistor 21 is coupled to a first terminal P1. The first terminal P1 is supplied with an input voltage Vin. A drain of the first transistor 21 is coupled to a drain of the second transistor. A source of the second transistor is coupled to a ground GND.

A node N1 between the first transistor 21 and the second transistor is coupled to a first terminal of the inductor 25. A second terminal of the inductor 25 is coupled to a node N2 between the third transistor 23 and the fourth transistor. A source of the third transistor 23 is coupled to the ground GND. A drain of the third transistor 23 is coupled to a drain of the fourth transistor 24. A source of the fourth transistor 24 is coupled to a second terminal P2. The second terminal P2 is coupled to a first terminal of the capacitor 26, and a second terminal of the capacitor 26 is coupled to the ground GND.

Gate terminals of the first transistor 21 to the fourth transistor 24 are respectively supplied with a first drive signal DR1, a second drive signal DR2, a third drive signal DR3, and a fourth drive signal DR4 from the control circuit 12. The first transistor 21 to the fourth transistor 24 turn on and off in response to the drive signals DR1 to DR4. For example, a state in which the first transistor 21 and the third transistor 23 are turned on and the second transistor 22 and the fourth transistor 24 are turned OFF may be set as a state 1. In the state 1, a current I1 flows, and energy is accumulated in the inductor 25. A state in which the second transistor 22 and the fourth transistor 24 are turned on and the first transistor 21 and the third transistor 23 are turned off may be set as a state 2. In the state 2, a current I2 flows, and the energy accumulated in the inductor 25 is discharged. A state in which the first transistor 21 and the fourth transistor 24 are turned on and the second transistor 22 and the third transistor 23 are turned off may be set as a state 3. In the state 3, a current I3 flows.

In a step-down mode, the state 2 and the state 3 may be alternately repeated. The third transistor 23 is turned OFF, and the fourth transistor 24 is turned ON. The current I2 and the current I3 alternately flow, and a smoothed output voltage Vout is output from the capacitor 26. In a boost mode, the state 1 and the state 3 may be alternately repeated. The second transistor 22 is turned off, and the fourth transistor 24 is turned on. The current I1 and the current I3 alternately flow, and the smoothed output voltage Vout is output from the capacitor 26. In the respective modes, the control circuit 12 controls periods for turning on or off the transistors 21 to 24, for example, periods for the state 1, the state 2, or the state 3 so that the output voltage Vout is maintained to a target voltage.

The control circuit 12 includes an error signal generation circuit 31, a pulse-width modulation (PWM) signal generation circuit 32, an oscillator 33, a state control circuit 34, a control signal generation circuit 35, and a through current prevention circuit 36.

The error signal generation circuit 31 is coupled to the second terminal P2 of the output unit 11 and is supplied with the output voltage Vout. The error signal generation circuit 31 includes resistors 41 and 42, an amplifier 43, a reference supply 44, and a capacitor 45. The output voltage Vout is supplied to a first terminal of the resistor 41, a second terminal of the resistor 41 is coupled to a first terminal of the resistor 42, and a second terminal of the resistor 42 is coupled to the ground GND. A node between both the resistors 41 and 42 is coupled to an inverting input terminal of the amplifier 43. A non-inverting input terminal of the amplifier 43 is supplied with a reference voltage Vref from the reference supply 44. An output terminal of the amplifier 43 is coupled to the inverting input terminal of the amplifier 43 via the capacitor 45 for phase compensation.

The resistors 41 and 42 divide the output voltage Vout at a division ratio of respective resistance values to generate a voltage Vfb. The voltage Vfb may be a voltage in proportion to the output voltage Vout. The amplifier 43 amplifies a difference voltage between the voltage Vfb and the reference voltage Vref and outputs the difference voltage as an error voltage Ver. The resistance values of the resistors 41 and 42 and the reference voltage Vref may be set in accordance with a target voltage for stabilizing the output voltage Vout. For example, similarly as the output voltage Vout, the reference voltage Vref may be a voltage obtained by dividing the target voltage at division ratio of the resistors 41 and 42. When the reference voltage Vref is supplied at a connection point of the resistor 41 and the resistor 42, a voltage generated at the first terminal of the resistor 41 may be the target voltage for stabilizing the output voltage Vout. The error voltage Ver may be a voltage in proportion to a difference voltage between the output voltage Vout and the target voltage. The error voltage Ver is supplied to the PWM signal generation circuit 32. The reference voltage Vref is supplied to the state control circuit 34.

The PWM signal generation circuit 32 includes a comparator 51, an RS flip-flop circuit (hereinafter, which will be referred to as RS-FF circuit) 52, and a slope voltage generation circuit 53. An inverting input terminal of the comparator 51 is supplied with the error voltage Ver. A non-inverting input terminal of the comparator 51 is supplied with a slope voltage Vsl from the slope voltage generation circuit 53.

The slope voltage generation circuit 53 includes a transistor 54 and a capacitor 55. The transistor 54 may be, for example, an N-channel MOS transistor. A source of the transistor 54 may be coupled to the ground, and a drain of which may be coupled to the first terminal of the capacitor 55. A second terminal of the capacitor 55 is coupled to the ground. The first terminal of the capacitor 55 is supplied with a constant current Iosc from the oscillator 33. A gate of the transistor 54 is supplied with a clock signal Pck having a certain period from the state control circuit 34. The transistor 54 turns on and off in response to the clock signal Pck. When the transistor 54 turns on, the charge accumulated in the capacitor 55 is discharged, and the slope voltage Vsl is set to be at a ground level, for example, 0 V. When the transistor 54 turns off, the charge is accumulated in the capacitor 55 by the constant current Iosc and the slope voltage Vsl increases. For that reason, the slope voltage Vsl becomes a triangular wave with a period substantially equal to the period of the clock signal Pck.

The comparator 51 outputs a signal Scp in accordance with a result of a comparison between the voltage Ver and the voltage Vsl. For example, when the slope voltage Vsl is lower than the error voltage Ver, the comparator 51 outputs the signal Scp at a low level, and when the slope voltage Vsl is higher than the error voltage Ver, the comparator 51 outputs the signal Scp at a high level. When the output voltage Vout increases, the error voltage Ver decreases. Thus, a period in which the signal Scp is at the high level is lengthened, and a period in which the signal Scp is at the low level is shortened. When the output voltage Vout decreases, the error voltage Ver increases. Thus, the period in which the signal Scp is at the high level is shortened, and the period in which the signal Scp is at the high level is lengthened. A duty of the signal Scp may change in accordance with the output voltage Vout.

The signal Scp is supplied to a reset terminal of the RS-FF circuit 52. A set terminal of the RS-FF circuit 52 is supplied with the clock signal Pck. The RS-FF circuit 52 outputs a signal Spwm at the high level from a terminal Q in response to the clock signal Pck at the high level and outputs the signal Spwm at the low level in response to the signal Scp at the high level output from output from the comparator 51.

The RS-FF circuit 52 outputs the signal Spwm at the high level during a period from a rising of the clock signal Pck to a rising of the comparison signal Scp. The signal Spwm may be at the high level during a period from the rising of the clock signal Pck to a time when the slope voltage Vsl becomes higher than the error voltage Ver. A change of the signal Scp output from the comparator 51 may be delayed by a response time of the comparator 51. For that reason, a pulse width of the signal Spwm output from the RS-FF circuit 52, for example, a minimum value during the high level may depend on the response time of the comparator 51. The pulse width of the signal Spwm may not be equal to or smaller than the response time of the comparator 51.

The oscillator 33 outputs a clock signal CK with a certain period. The period of the clock signal CK may correspond to a switching period of the switching supply 10, for example, a switching cycle. For example, the oscillator 33 may output the clock signal CK with the cycle with a period substantially equal to the switching period. The clock signal CK is supplied to the state control circuit 34.

The state control circuit 34 is supplied with the reference voltage Vref and the input voltage Vin. The state control circuit 34 outputs, based on the clock signal CK, the clock signal Pck having a period substantially the same as that of the clock signal CK and a certain pulse width. The state control circuit 34 generates a mask signal Smk and a mode signal Smd based on the input voltage Vin and the reference voltage Vref.

Figure 2:
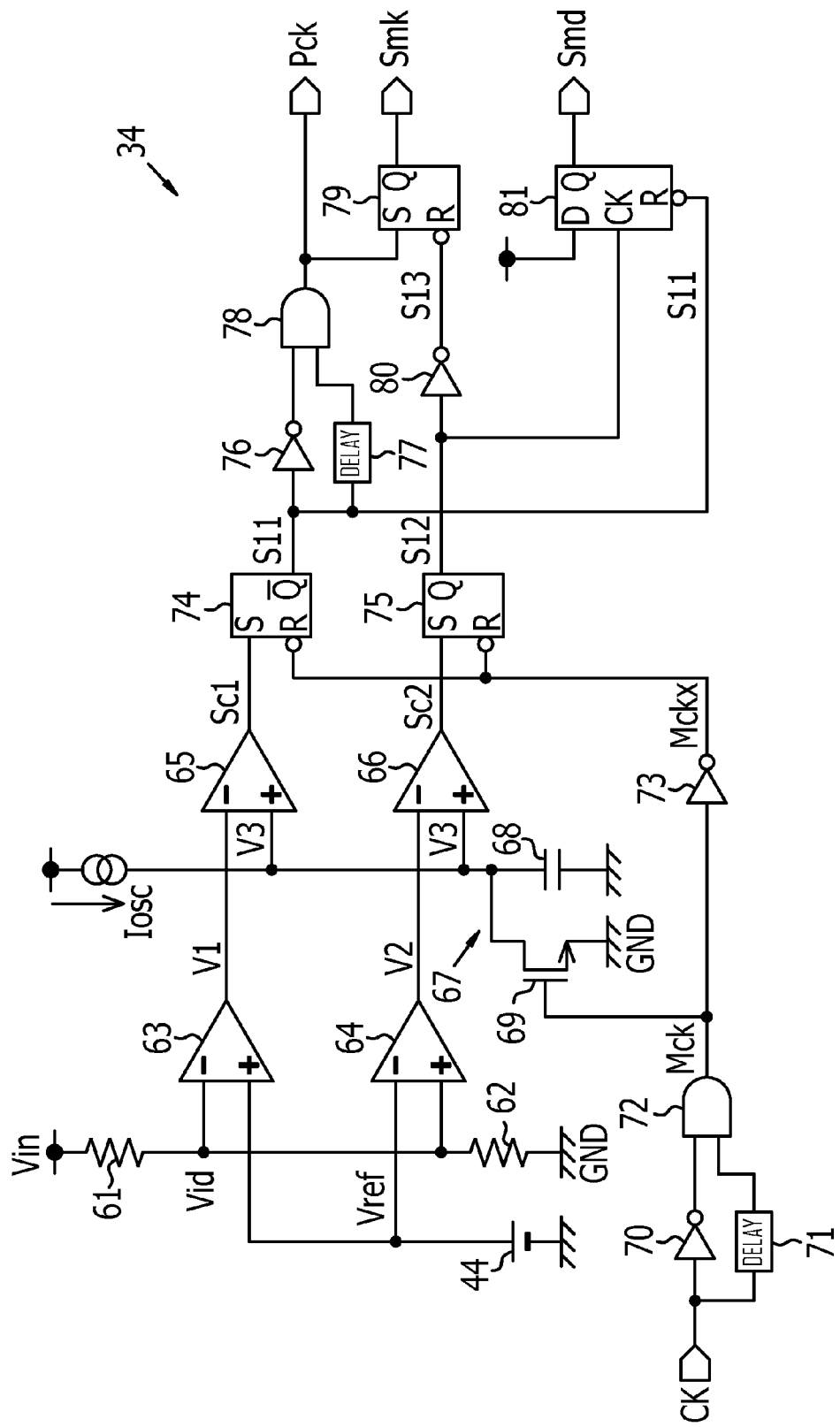
FIG. 2 illustrates an exemplary state control circuit.

As illustrated in FIG. 2, the input voltage Vin is supplied to a resistor 61. The resistor 61 and a resistor 62 coupled in series to the resistor 61 generate a voltage Vid by dividing the input voltage Vin in accordance with a ratio of respective resistance values. The voltage Vid is supplied to an inverting input terminal of a first amplifier 63 and a non-inverting input terminal of a second amplifier 64. A non-inverting input terminal of the first amplifier 63 and an inverting input terminal of the second amplifier are supplied with the reference voltage Vref.

The first amplifier 63 amplifies a difference voltage between the voltage Vid and the reference voltage Vref and outputs a first difference voltage V1. The output voltage V1 of the first amplifier 63 is a substantially constant voltage when the input voltage Vin is stable, but when the input voltage Vin decreases, the output voltage V1 may increase. The second amplifier 64 amplifies a difference voltage between the voltage Vid and the reference voltage Vref and outputs a second difference voltage V2. The output voltage V2 of the second amplifier 64 is a substantially constant voltage when the input voltage Vin is stable, but when the input voltage Vin decreases, the output voltage V2 may decrease.

The first difference voltage V1 output from the first amplifier 63 is supplied to an inverting input terminal of a first comparator 65, and the second difference voltage V2 output from the second amplifier 64 is supplied to an inverting input terminal of a second comparator 66. Non-inverting input terminals of the comparators 65 and 66 are coupled to a triangular wave generation circuit 67. The triangular wave generation circuit 67 includes a capacitor 68 and a transistor 69. The transistor 69 may be, for example, an N-channel MOS transistor. The non-inverting input terminals of the comparators 65 and 66 are coupled to a first terminal of the capacitor 68, and a second terminal of the capacitor 68 is coupled to the ground. The capacitor 68 is supplied with a current Iosc.

A drain of the transistor 69 is coupled to the first terminal of the capacitor 68, and a source of the transistor 69 is coupled to the ground GND. A gate of the transistor 69 is supplied with a clock signal Mck. The clock signal Mck may be generated, for example, based on the clock signal CK output from the oscillator 33 illustrated in FIG. 1.

The clock signal CK is supplied to an inverter circuit 70 and a delay circuit 71. The inverter circuit 70 inverts the clock signal CK. The delay circuit 71 delays the clock signal CK by a certain period of time. An AND circuit 72 performs an AND operation on an output signal of the inverter circuit 70 and an output signal of the delay circuit 71, and outputs the clock signal Mck. The clock signal Mck may have substantially the same period as that of the clock signal CK, and may be a pulse signal whose level becomes high during a period of time corresponding to the delay time of the delay circuit 71. The inverter circuit 70, the delay circuit 71, and the AND circuit 72 may be included in a pulse signal generation circuit that generates the clock signal Mck.

When the clock signal CK becomes a low level, the clock signal Mck becomes a high level, the transistor 69 turns on, and the charged charge of the capacitor 68 is discharged. When the clock signal Mck becomes a low level after a certain period of time elapses, the transistor 69 turns off, and the capacitor 68 is charged by the current Iosc. For that reason, a charged voltage V3 of the capacitor 68 may be substantially at the ground level when the clock signal Mck becomes a high level. The voltage V3 gradually increases when the clock signal Mck becomes a low level. The voltage V3 may change into a triangular wave shape because of a repetition of the discharge and the charge of the capacitor 68 based on ON/OFF of the transistor 69.

The first comparator 65 outputs a signal Sc1 in accordance with a result of a comparison between the first difference voltage V1 and the voltage V3. For example, the first comparator 65 outputs the signal Sc1 at the low level when the slope voltage V3 is lower than the first difference voltage V1 and makes the signal Sc1 the high level when the slope voltage V3 exceeds the first difference voltage V1.

The output signal Sc1 of the first comparator 65 is supplied to a set terminal of a first RS-FF circuit 74. A reset terminal of the first RS-FF circuit 74 is supplied with an output signal Mckx of an inverter circuit 73 to which the clock signal Mck is input. The first RS-FF circuit 74 changes a level of a signal S11 output from the inverse output terminal Q bar based on the signal Mckx and the signal Sc1. For example, the first RS-FF circuit 74 makes the signal S11 to a high level in response to the signal Mckx at a low level and makes the signal S11 to a low level in response to the signal Sc1 at a high level.

The output signal S11 of the RS-FF circuit 74 is supplied to an inverter circuit 76, a delay circuit 77, and a reset terminal of a D-FF circuit 81. The inverter circuit 76 inverts the signal S11. The delay circuit 77 delays the signal S11 by a certain period of time. An AND circuit 78 performs an AND operation on an output signal of the inverter circuit 76 and an output signal of the delay circuit 77, and outputs the clock signal Pck at a low level. The clock signal Pck is supplied to a set terminal of a third RS-FF circuit 79.

The second comparator 66 outputs a signal Sc2 in accordance with a result of a comparison between the second difference voltage V2 and the voltage V3. For example, the second comparator 66 outputs the signal Sc2 at a low level when the slope voltage V3 is lower than the second difference voltage V2 and raises the signal Sc2 to a high level when the slope voltage V3 exceeds the second difference voltage V2.

The output signal Sc2 of the second comparator 66 is supplied to a set terminal of a second RS-FF circuit 75. A reset terminal of the second RS-FF circuit 75 is supplied with the signal Mckx. The second RS-FF circuit 75 changes a signal S12 output from the output terminal Q base on the signal Mckx and the signal Sc2. For example, the second RS-FF circuit 75 sets the signal S12 at a high level in response to the signal Mckx at a low level m and set the signal S12 at a low level in response to the signal Sc2 at a high level.

The output signal S12 of the second RS-FF circuit 75 is supplied to an inverter circuit 80 and a clock terminal of the D-FF circuit 81. The inverter circuit 80 inverts the signal S12 and outputs a signal S13. The signal S13 is supplied to a reset terminal of the third RS-FF circuit 79.

The third RS-FF circuit 79 changes the mask signal Smk output from the output terminal Q in response to the clock signal Pck and the signal S13. For example, the third RS-FF circuit 79 sets the mask signal Smk at a low level in response to the signal S13 at a high level and sets the mask signal Smk at a high level in response to the clock signal Pck at a high level.

A data input terminal of the D-FF circuit 81 may be pulled up. The D-FF circuit 81 changes the mode signal Smd output from the output terminal Q based on the signal S11 and the signal S12. For example, the D-FF circuit 81 sets the mode signal Smd at a low level in response to the signal S11 at a low level and sets the mode signal Smd at a high level in response to the signal S12 at a high level.

The first difference voltage V1 output from the first amplifier 63 and the second difference voltage V2 output from the second amplifier respectively change in accordance with the input voltage Vin. A timing when the first comparator 65 raises the output signal Sc1 to a high level and a timing when the second comparator 66 raises the output signal Sc2 to a high level may change in accordance with the first difference voltage V1 and the second difference voltage V2, for example, the input voltage Vin.

When the input voltage Vin decreases, the first difference voltage V1 increases and the second difference voltage V2 decreases. When the input voltage Vin decreases and the first difference voltage V1 increases, the timing when the first comparator 65 raises the output signal Sc1 to a high level may be delayed. When the input voltage Vin v and the second difference voltage V2 decreases, the timing when the second comparator 66 raises the output signal Sc2 at a high level may be earlier.

Figure 3:
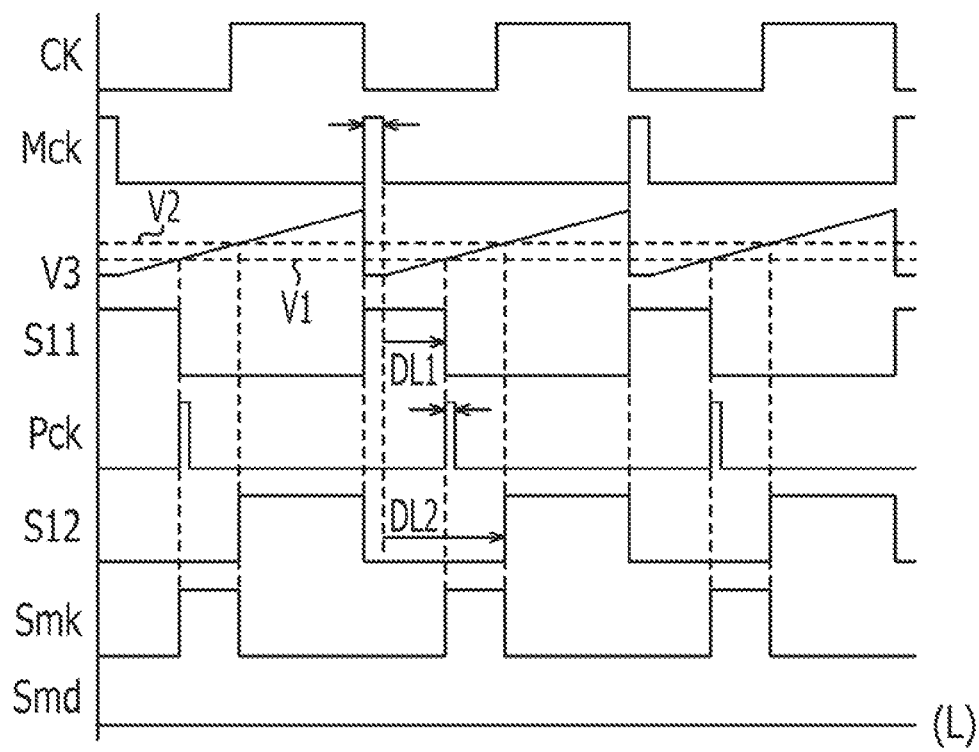
FIG. 3 illustrates an exemplary operation by a state control circuit.

FIG. 3 illustrates an exemplary operation of a state control circuit. The first RS-FF circuit 74 resets the signal S11 to a high level in response to the clock signal Mck at a low level. The first RS-FF circuit 74 sets the signal S11 at a low level in response to the signal Sc1 at a high level. As illustrated in FIG. 3, the signal S11 output from the first RS-FF circuit 74 may be at a high level during a period from the trailing of the clock signal Mck, for example, the rising of the inverse clock signal Mckx to a time when the triangular wave voltage V3 exceeds the first difference voltage V1. The signal S11 may trail with a delay time corresponding to the input voltage Vin from the trailing of the clock signal Mck. The delay time may be set as a first delay time DL1.

Figure 4:
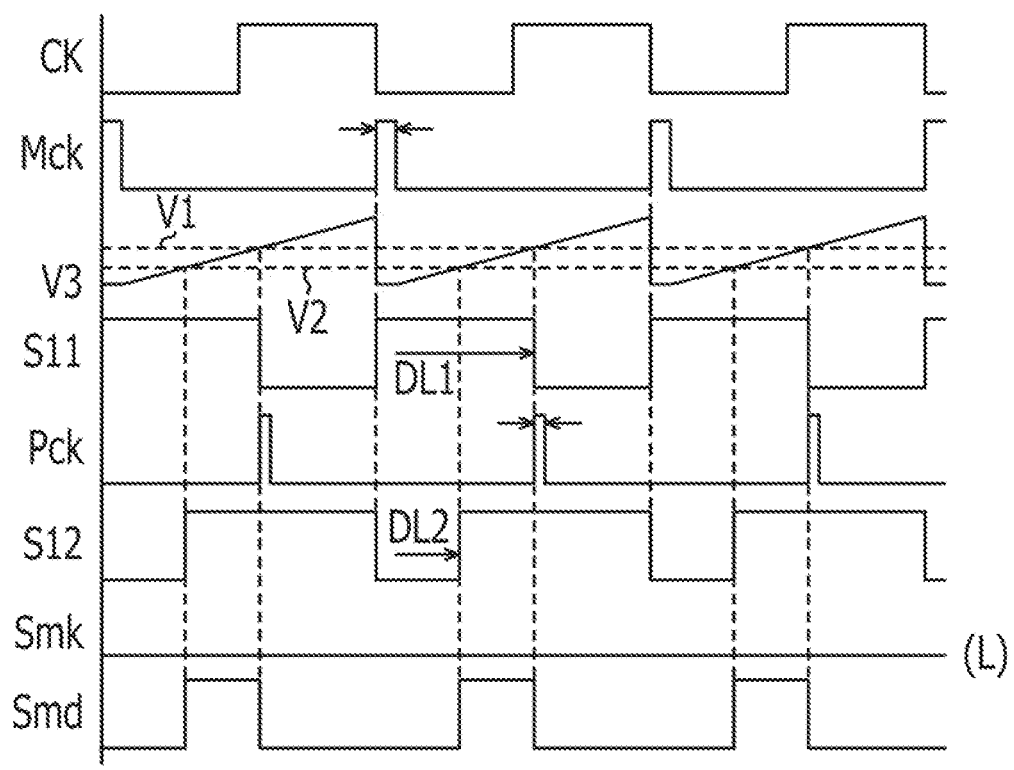
FIG. 4 illustrates an exemplary operation by a state control circuit.

The second RS-FF circuit 75 sets the signal S12 at a low level in response to the clock signal Mck at a low level. The second RS-FF circuit 75 sets the signal S12 at a high level in response to the signal Sc2 at a high level. As illustrated in FIG. 4, the signal S12 output from the second RS-FF circuit 75 may be at a low level during a period from the trailing of the clock signal Mck, for example, the rising of the inverse clock signal Mckx to a time when the triangular wave voltage V3 exceeds the second difference voltage V2. The signal S12 may rise with a delay time corresponding to the input voltage Vin from the clock signal Mck. The delay time may be set as a second delay time DL2.

When the input voltage Vin decreases, the first difference voltage V1 increases and the second difference voltage V2 may decrease. The first difference voltage V1 and the second difference voltage V2 may have an inversely proportional relationship. The first delay time DL1 and the second delay time DL2 may mutually change in an inversely proportional manner in accordance with the input voltage Vin.

The pulse signal generation circuit including the inverter circuit 76, the delay circuit 77, and the AND circuit 78 generates the clock signal Pck at a high level during a period until the set time by the delay circuit 77 elapses from the trailing timing of the output signal S11 of the first RS-FF circuit 74. The clock signal Pck is supplied to a set terminal of the third RS-FF circuit 79. The reset terminal of the third RS-FF circuit 79 is supplied with the signal S13 obtained by inverting the output signal S12 of the second RS-FF circuit 75 by the inverter circuit 80. A data terminal of the D-FF circuit 81 is pulled up, a clock terminal is supplied with the output signal S12 of the second RS-FF circuit 75, and a reset terminal is supplied with the output signal S11 of the first RS-FF circuit 74.

As illustrated in FIG. 3, when the input voltage Vin is larger than the output voltage Vout, for example, when Vin>>Vout is established, the clock signal Pck at a high level is output. For example, after the first RS-FF circuit 74 outputs the signal S11 at a low level, the signal S12 at a level may be output from the second RS-FF circuit 75. During a period from a time when the clock signal Pck at a high level is input to a time when the signal S12 at a high level is output, the mask signal Smk at a high level is output from the third RS-FF circuit 79. Before the output signal S12 of the second RS-FF circuit 75 becomes a high level, the output signal S11 of the first RS-FF circuit 74 becomes a low level, and thus the D-FF circuit 81 maintains the mode signal Smd to a low level.

FIG. 4 illustrates an exemplary operation of a state control circuit. When the input voltage Vin decreases to approach the output voltage Vout (Vin>Vout), as illustrated in FIG. 4, the signal S13 becomes a low level before the clock signal Pck at a high level is input. For example, the timing when the output signal S12 of the second RS-FF circuit 75 becomes a high level may be earlier. The output signal Smk of the third RS-FF circuit 79 may not be set. For example, the output signal Smk may maintain a low level. After the output signal S12 of the second RS-FF circuit 75 becomes a high level, the output signal S11 of the first RS-FF circuit 74 becomes a low level, and the D-FF circuit 81 outputs the mode signal Smd at a high level during that period.

For example, a pulse width of the clock signal Mck illustrated in FIG. 3 or FIG. 4 may be decided based on the delay time of the delay circuit 71 illustrated in FIG. 2. A pulse width of the clock signal Pck illustrated in FIG. 3 or FIG. 4 may be decided based on the delay time of the delay circuit 77 illustrated in FIG. 2.

The state control circuit 34 output one of the mask signal Smk and the mode signal Smd based on a comparison result between the voltage Vid obtained by dividing the input voltage Vin and the reference voltage Vref. A circuit to which the signal is supplied upon the output of the signal, for example, the transistors 21 to 24 of the output circuit 11 may be activated, for example, may be controlled, or deactivated, for example, fixed to an ON state or an OFF state. The state control circuit 34 may change the output signal, for example, the pulse width of the mask signal Smk, the mode signal Smd, or the like in accordance with a difference voltage between the voltage Vid obtained by dividing the input voltage Vin and the reference voltage Vref.

The reference voltage Vref may be set in accordance with the target voltage for stabilizing the output voltage Vout. The state control circuit 34 may output the mask signal Smk and the mode signal Smd in accordance with a difference voltage between the input voltage Vin and the output voltage Vout.

For example, as illustrated in FIG. 1, the PWM control signal Spwm output from the PWM signal generation circuit 32, the mask signal Smk output from the state control circuit 34, and the mode signal Smd may be supplied to the control signal generation circuit 35.

Figure 5:
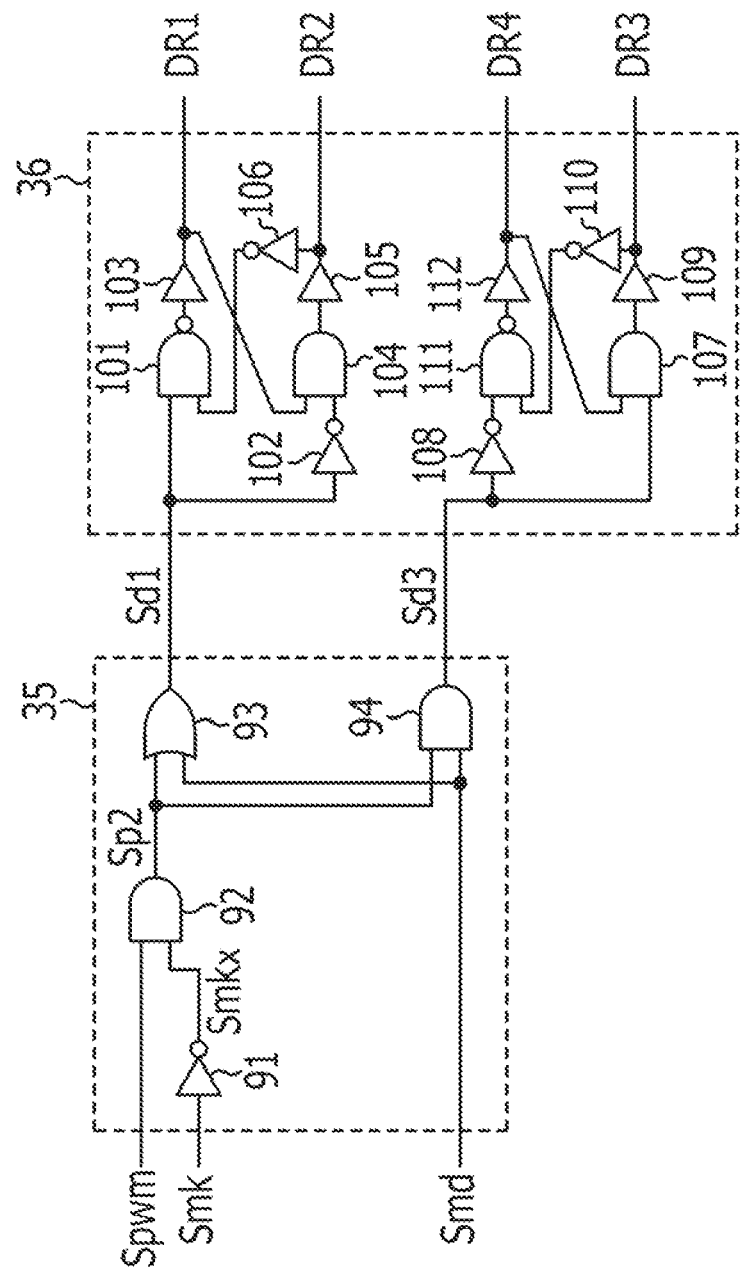
FIG. 5 illustrates an exemplary control signal generation circuit and an exemplary through current prevention circuit.

FIG. 5 illustrates an exemplary control signal generation circuit and an exemplary feed-through current prevention circuit. The mask signal Smk is input to an inverter circuit 91. The inverter circuit 91 outputs an inverse mask signal Smkx obtained by logical-inverting the mask signal Smk. The inverse mask signal Smkx may become a low level at the rising timing of the clock signal Pck and become a high level after a period of time corresponding to the input voltage Vin. The PWM control signal Spwm and the inverse mask signal Smkx are input to an AND circuit 92. The AND circuit 92 performs an AND operation on the signal Spwm and the inverse mask signal Smkx and outputs a control signal Sp2.

An OR circuit 93 performs an OR operation on the output signal Sp2 of the AND circuit 92 and the mode signal Smd and outputs a control signal Sd1. The OR circuit 93 outputs the control signal Sd1 at a high level irrespective of the output signal Sp2 when the mode signal Smd is at a high level. When the mode signal Smd is at a low level, the OR circuit 93 may output the control signal Sd1 at a level substantially equal to a level of the control signal Sp2.

An AND circuit 94 performs an AND operation on the output signal Sp2 of the AND circuit 92 and the mode signal Smd and outputs a control signal Sd3. The AND circuit 94 outputs the control signal Sd3 at a level substantially equal to a level of the control signal Sp2 when the mode signal Smd is at a high level. When the mode signal Smd is at a low level, the AND circuit 94 outputs the control signal Sd3 at a low level irrespective of the output signal Sp2.

The through current prevention circuit 36 generates the drive signals DR1 to DR4 based on the control signals Sd1 and Sd3 of the control signal generation circuit 35. The through current prevention circuit 36 reduces a through current flowing when the first transistor 21 and the second transistor 22 or the third transistor 23 and the fourth transistor 24 turn ON substantially at the same time.

The control signal Sd1 is input to a NAND circuit 101 and an inverter circuit 102. An output signal of the NAND circuit 101 is input to a buffer circuit 103, and the buffer circuit 103 outputs a drive signal DR1. An output signal of the inverter circuit 102 is input to an AND circuit 104, and an output signal of the buffer circuit 103, for example, the drive signal DR1, is input to the AND circuit 104. An output signal of the AND circuit 104 is input to a buffer circuit 105, and the buffer circuit 105 outputs a drive signal DR2. The drive signal DR2 is input to an inverter circuit 106, and an output signal of the inverter circuit 106 is input to the NAND circuit 101.

The control signal Sd3 is input to an AND circuit 107 and an inverter circuit 108. An output signal of the AND circuit 107 is input to an inverter circuit 109, and the inverter circuit 109 outputs a drive signal DR3. The drive signal DR3 is input to an inverter circuit 110, and an output signal of the inverter circuit 110 is input to a NAND circuit 111. An output signal of the NAND circuit 111 is input to a buffer circuit 112, and a drive signal DR4 is output from the buffer circuit 112. The drive signal DR4 is input to the AND circuit 107.

An operation delay time of the buffer circuit 103, 105, 109, or 112 may be larger than an operation delay time of the AND circuit, the NAND circuit, or the inverter circuit for driving gate capacitances of the transistors 21 to 24.

The through current prevention circuit 36 generates the drive signals DR1 and DR2. The output signal Sd1 may be at a low level when the output signal Spwm of the RS-FF circuit 52 and the output signal Smd of the state control circuit 34 are both at a low level. The drive signal DR1 rises with an operation delay time t1 of the buffer circuit 103 from the trailing of the signal Sd1 and trails with operation delay times of the buffer circuits 105 and 103 from the rising of the signal Sd1. A pulse width at a high level of the drive signal DR1 may be larger than a pulse width at a low level of the signal Sd1. The drive signal DR2 rises with an operation delay time of the buffer circuit 105 from the rising of the drive signal DR1 and trails with an operation delay time of the buffer circuit 105 from the rising of the signal Sd1.

The drive signal DR2 rises after the rising of the drive signal DR1 and trails before the trailing of the drive signal DR1. For that reason, in the state 2 and the state 3, the through current flowing when the transistors 21 and 22 turn on substantially at the same time may be reduced.

The through current prevention circuit 36 generates the drive signals DR3 and DR4. The output signal Sd3 becomes a high level when the output signal Spwm of the RS-FF circuit 52 and the output signal Smd of the state control circuit 34 become a high level. The drive signal DR4 rises with an operation delay time t2 of the buffer circuit 112 from the rising of the signal Sd3 and trails with operation delay times of the inverter circuits 109 and 112 from the trailing of the signal Sd3. A pulse width at a high level of the drive signal DR4 may be larger than a pulse width at a high level of the signal Sd3. The drive signal DR3 rises with an the operation delay time of the inverter circuit 109 from the rising of the drive signal DR4 and trails with an operation delay time of the inverter circuit 109 from the trailing of the signal Sd3.

The drive signal DR3 rises after the rising of the drive signal DR4 and trails before the trailing of the drive signal DR4. For that reason, the through current flowing when the transistors 23 and 24 turn on substantially at the same time is reduced.

Figure 6:
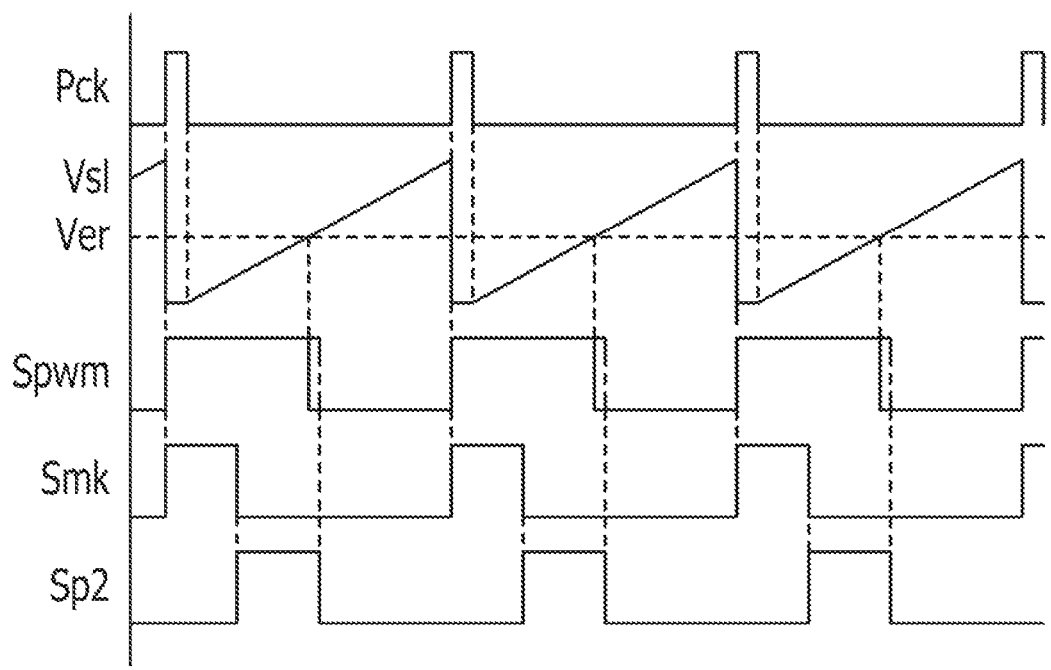
FIG. 6 illustrates an exemplary operation of a mask signal.

FIG. 6 illustrates an exemplary operation of a mask signal. As illustrated in FIG. 6, the slope voltage Vsl repeatedly increases and decreases in a triangular wave shape in synchronization with the clock signal Pck. The PWM control signal Spwm rises based on the rising of the clock signal Pck. The PWM control signal Spwm may trail when the voltage of the slope voltage Vsl is higher than the error voltage Ver. As the output signal Scp of the comparator 51 changes with a delay by the response time, the PWM control signal Spwm may trail with a delay as illustrated by a dashed-dotted line of FIG. 6.

The mask signal Smk rises in synchronization with the clock signal Pck and trails before the PWM control signal Spwm trails. The state control circuit 34 outputs the mask signal Smk. The AND circuit 92 of the control signal generation circuit 35 illustrated in FIG. 3 performs an AND operation on the inverse mask signal Smkx of the mask signal Smk and the PWM control signal Spwm, and outputs the signal Sp2. The transistors 21 to 24 of the output unit 11 are controlled by the control signals Sd1 and Sd3 generated based on the signal Sp2. For example, in the buck mode, the first transistor 21 is controlled based on Sd1. As compared with a case in which the first transistor 21 is controlled by the PWM control signal Spwm, the ON-period of the first transistor 21 may be shortened.

Figure 7:
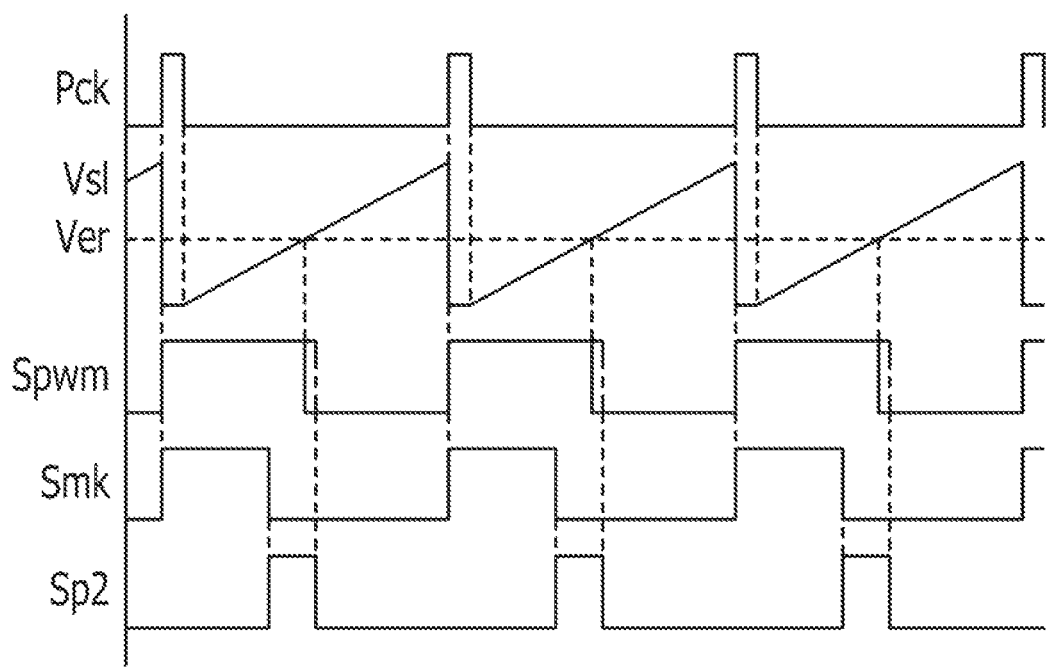
FIG. 7 illustrates an exemplary operation of a mask signal.

FIG. 7 illustrates an exemplary operation of a mask signal. A pulse width of the mask signal Smk may be changed in accordance with the input voltage Vin. For example, when the input voltage Vin becomes high, as illustrated in FIG. 7, the pulse width of the mask signal Smk may be lengthened. For that reason, in accordance with the input voltage Vin, a pulse width of the signal Sp2 may be controlled. For example, in the buck mode, the ON-period of the first transistor 21 controlled by the signal Sp2 may be shortened in accordance with the input voltage Vin. For example, the pulse width of the signal Sp2 may become shorter than the response time of the comparator 51 illustrated in FIG. 2. A range of the input voltage Vin set by a response speed of the comparator or the like may be expanded.

In FIG. 6 and FIG. 7, for example, a setting a voltage may be varied like as a relation between the error voltage Ver and the slope voltage Vsl. A dead time of the through current prevention circuit 36, which is not illustrated, is smaller than the response time of the comparator 51 or the like and may therefore not affect the transistors 21 to 24.

Figure 8:
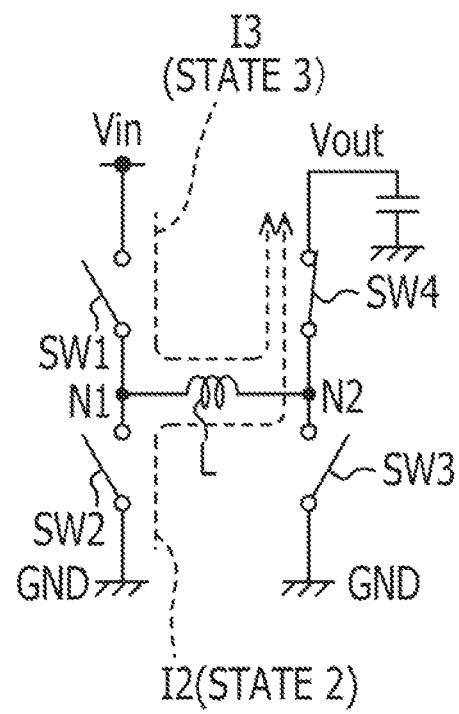
FIG. 8 illustrates an exemplary switching supply circuit.
Figure 9:
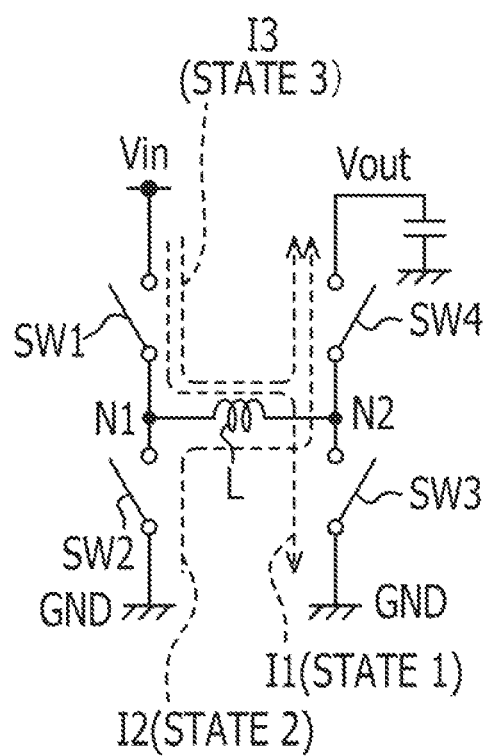
FIG. 9 illustrates an exemplary switching supply circuit.
Figure 10:
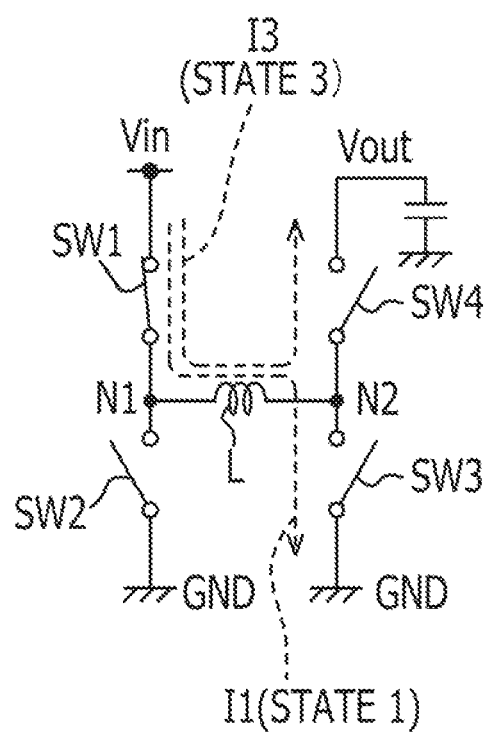
FIG. 10 illustrates an exemplary switching supply circuit.

FIG. 8, FIG. 9, and FIG. 10 illustrate an exemplary switching supply circuit. The switching supply circuit illustrated in FIGS. 8 to 10 may be an H bridge step-down and boost type switching supply circuit. Also, FIGS. 8 to 10 illustrate an output circuit of the switching supply circuit.

The output circuit includes switch circuits SW1 to SW4 and an inductor L. The node N1 corresponding to one end of the inductor L is supplied with the input voltage Vin via the switch circuit SW1. The node N1 is coupled to the ground GND via the switch circuit SW2. The node N2 corresponding to the other end of the inductor L is coupled to the ground GND via the switch circuit SW3 and outputs the output voltage Vout via the switch circuit SW4.

For example, when the output voltage Vout is set to 3.2 V, the output circuit may enter the buck mode when the input voltage Vin is equal to or larger than 4.0 V, the output circuit may enter the boost-buck mode when the input voltage Vin is larger than 2.8 V and smaller than 4 V (2.8 V<Vin<4 V), and the output circuit may enter the boost mode when the input voltage Vin is equal to or smaller than 2.8 V.

In the boost-buck mode, as illustrated in FIG. 9, in the state 1, the state 2, and the state 3, the switch circuits SW1 to SW4 are controlled. In the state 1, the switch circuits SW1 and SW3 turn on, the switch circuits SW2 and SW4 turn off, the current I1 flows, and energy is accumulated in the inductor L.

In the state 2, the switch circuits SW2 and SW4 turn on, the switches SW1 and SW3 turn off, the current I2 flows, and the energy accumulated in the inductor L is discharged. In the state 3, the switch circuits SW1 and SW4 turn on, the switches SW2 and SW3 turn off, and the current I3 flows. The cycle of the state 1 to the state 3 may be repeated. Duties in the states 1 to 3 are controlled, and a boost-buck operation is performed.

In the buck mode, as illustrated in FIG. 8, the switch circuits SW1 and SW2 alternately turn on, the switch circuit SW4 turns on, the switch circuit SW3 turns off, and the state 2 and the state 3 are alternately repeated. The current I2 and the current I3 alternately flow, and the output voltage Vout is stepped down.

In the boost mode, as illustrated in FIG. 10, the switch circuits SW3 and SW4 alternately turn on, the switch circuit SW1 turns on, the switch circuit SW2 turns off, and the state 1 and the state 3 are alternately repeated. The currents I1 and I3 alternately flow, and the output voltage Vout is boosted. The duty of the switch circuit is controlled in the respective modes, and therefore the output voltage Vout may be maintained to 3.2 V.

In an H bridge boost-buck DC/DC converter, in the buck mode and the boost mode, two switch circuits among the switch circuits SW1 to SW4 perform a switching operation. Therefore, a power efficiency may be improved as compared with a case in which the four switch circuits perform the switching operation. In the boost-buck mode, as the switch circuits SW1 to SW4 perform the switching operation, the power efficiency may be decreased. In the state 1, the energy accumulated in the inductor L may be discharged without contributing to the output voltage Vout in the state 2. Without an intermediation of the boost-buck mode, if the mode is continuously shifted from the boost mode to the buck mode or from the buck mode to the boost mode, the power efficiency may be improved.

A ratio of the input voltage Vin and the output voltage Vout in the buck mode is represented in the following expression when a clock period of the DC/DC converter is set to T and a time of the state 2 is set to T2.

$$Vout/Vin=(T-t2)/T \qquad (1)$$

A ratio of the input voltage Vin and the output voltage Vout in the above-mentioned boost mode is represented in the following expression when a clock period of the DC/DC converter is set to T and a time of the state 1 is set to t1.

$$Vout/Vin=T/(T-t1) \qquad (2)$$

In the expressions (1) and (2), if t2 and t1 become closer to 0, the input voltage Vin is substantially equal to the output voltage Vout. When the time periods of the state 2 and the state 1 are set to be minimum, the input voltage Vin is substantially equal to the output voltage Vout, and therefore the boost-buck mode may not be set.

Figure 11:
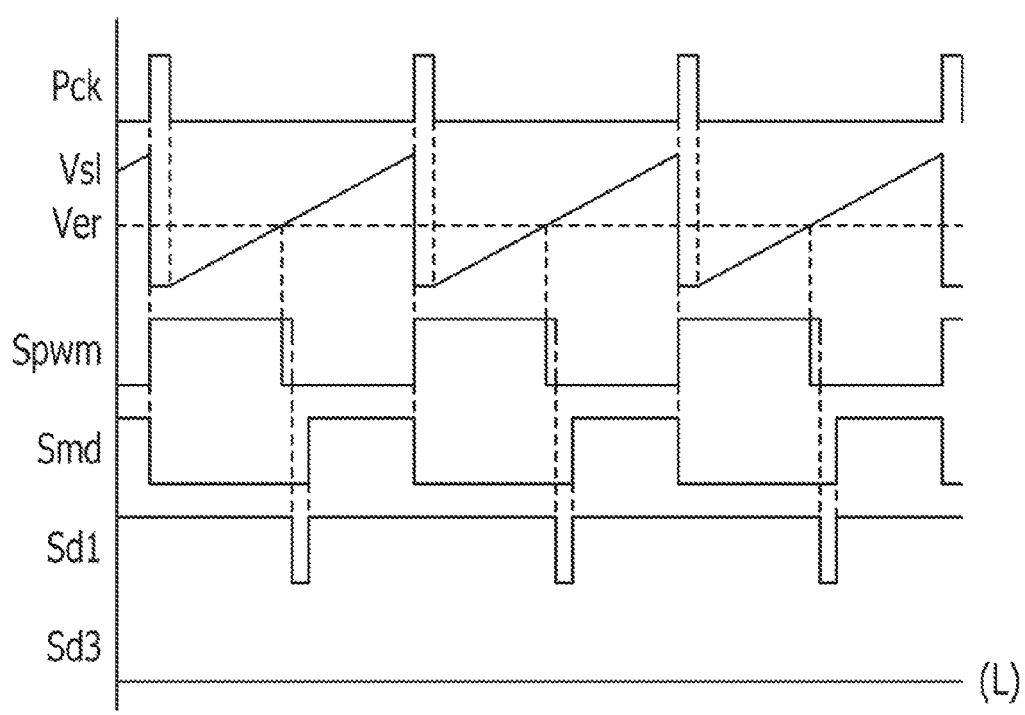
FIG. 11 illustrates an exemplary operation of a mode signal.
Figure 12:
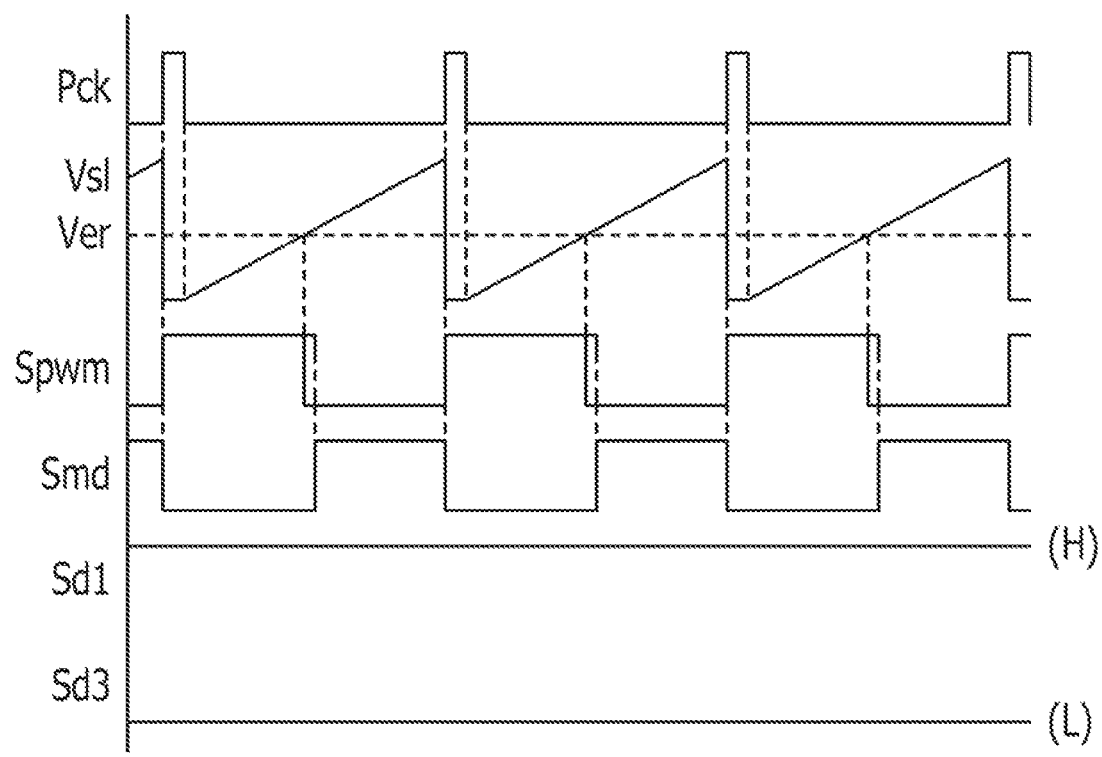
FIG. 12 illustrates an exemplary operation of a mode signal.
Figure 13:
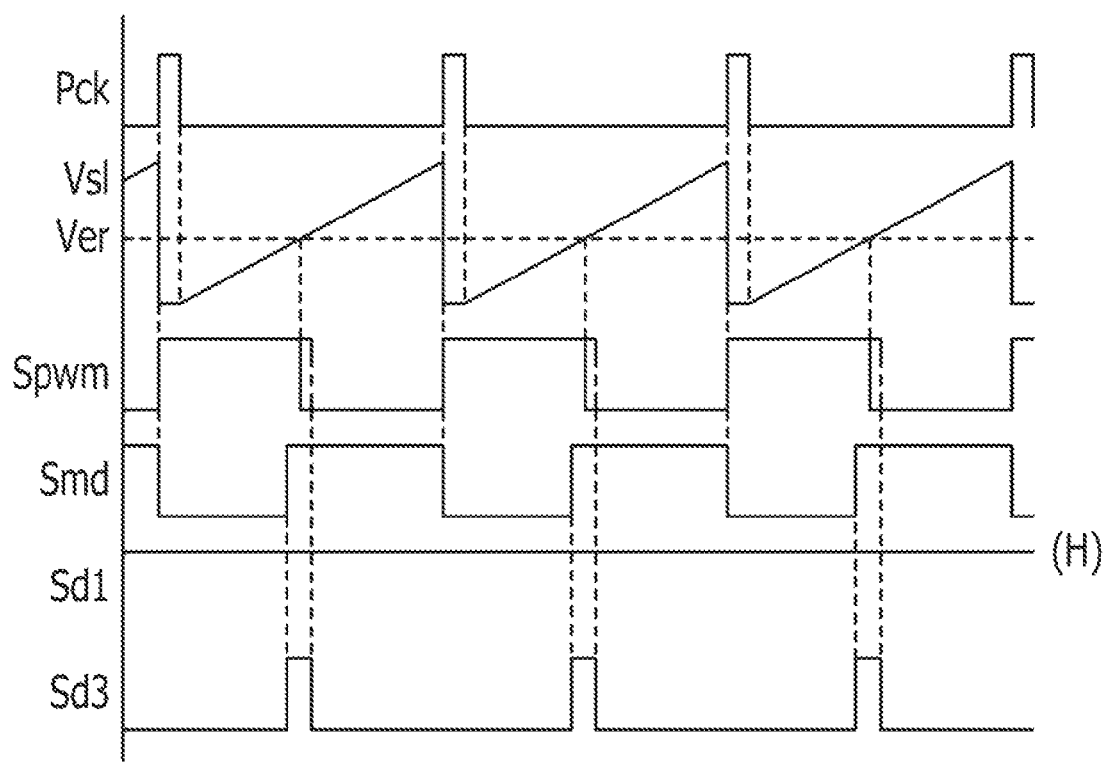
FIG. 13 illustrates an exemplary operation of a mode signal.

FIG. 11, FIG. 12, and FIG. 13 illustrate an exemplary operation of a mode signal. The state control circuit 34 changes the pulse width of the mode signal Smd based on a voltage change of the input voltage Vin. As illustrated in FIGS. 11 to 13, as the input voltage Vin is decreased, the timing for the rising of the mode signal Smd is earlier, and a pulse width at a high level of the mode signal Smd increases.

FIG. 11 illustrates an exemplary buck mode. In FIG. 11, the input voltage Vin is higher than the output voltage Vout. For example, the output signal Spwm of the RS-FF circuit 52 and the mode signal Smd output from the state control circuit 34, which are illustrated in FIG. 1, may both not become a high level. For that reason, the signal Sd3 at a low level is output from the AND circuit 94 illustrated in FIG. 5. The drive signals DR3 and DR4 become a low level, the transistor 23 turns off, and the transistor 24 turns on.

For example, the signal Sd1 output from the OR circuit 93 illustrated in FIG. 5 becomes a low level base on the rising of the output signal Spwm of the RS-FF circuit 52 illustrated in FIG. 1 and becomes a high level based on the rising of the mode signal Smd. As the drive signal DR1 is generated based on the signal Sd1, the transistor 21 is driven. The transistor 22 may be driven in a complementary manner with the transistor 21.

For example, the transistor 21 turns on, the transistor 22 turns off, and the state 3 illustrated in FIG. 1 is set. The transistor 21 turns off, the transistor 22 turns on, and the state 2 illustrated in FIG. 1 is set.

In the buck mode, as the input voltage Vin becomes higher than the output voltage Vout, a period td in which the mode signal Smd at a low level is lengthened, the low level period of the drive signal DR1 is relatively lengthened, and the time period of the state 2 is lengthened. As the input voltage Vin becomes closer to the output voltage, the period td in which the mode signal Smd at the low level is output is shortened, the low level period of the drive signal DR1 is relatively shortened, and the time period of the state 3 is lengthened.

When the input voltage Vin is substantially equal to the output voltage Vout, as illustrated in FIG. 12, the timing for the rising of the mode signal Smd is substantially matched with the timing for the trailing of the output signal Spwm of the RS-FF circuit 52, and the drive signal DR1 becomes a high level. The drive signal DR3 becomes a low level. The first transistor 21 illustrated in FIG. 1 maintains the on-state, and the second transistor 22 maintains the off-state. The third transistor 23 maintains the off-state, and the fourth transistor 24 maintains the on-state.

In FIG. 13, for example, the input voltage Vin illustrated in FIG. 12 further decreases to be lower than the output voltage Vout. The period td in which the mode signal Smd is at a low level is shortened, and the rising timing of the mode signal Smd may be earlier.

At the timing when the mode signal Smd rises before the trailing of the output signal Spwm of the RS-FF circuit 52 illustrated in FIG. 1 and the output signal Spwm and the mode signal Smd become a high level, the output signal Sd3 of the AND circuit 94 illustrated in FIG. 5 becomes a high level. As the drive signal DR3 is generated based on the signal Sd3, the third transistor 23 is driven. The fourth transistor 24 may be driven in a complementary manner with the third transistor 23.

The output signal Spwm of the RS-FF circuit 52 and the mode signal Smd may not become a low level. For that reason, the signal Sd1 at a high level is output from the OR circuit 93 illustrated in FIG. 5. The drive signals DR1 and DR2 become a high level, the first transistor 21 turns on, and the second transistor 22 turns off.

The third transistor 23 turns on, the fourth transistor 24 turns off, and the state 1 illustrated in FIG. 1 is set. The third transistor 23 turns off, the fourth transistor 24 turns on, and the state 3 illustrated in FIG. 1 is set.

In the boost mode, as the input voltage Vin becomes lower than the output voltage Vout, the period td in which the mode signal Smd at a low level is output is shortened, the high level period of the drive signal DR3 is relatively lengthened, and the time period of the state 1 is lengthened. As the input voltage Vin becomes closer to the output voltage Vout, the period td in which the mode signal Smd at the low level is output is lengthened, the high level period of the drive signal DR3 is relatively shortened, and the time period of the state 3 is lengthened.

Without an intermediation of the boost-buck mode, automatically, the buck mode is shifted to the boost mode, or the boost mode is shifted to the buck mode. The number of states in one cycle may be two. As compared with the number of the switching operations of the switching supply circuit having the boost-buck mode is smaller, a power loss is reduced.

In FIGS. 11 to 13, for example, a setting of voltages of the respective signals may be varied like as a relation between the error voltage Ver and the slope voltage Vsl.

As illustrated in FIG. 2, the first amplifier 63 outputs the first difference voltage V1 based on the division voltage Vid and the reference voltage Vref. The second amplifier 64 outputs the second difference voltage V2 based on the reference voltage Vref and the division voltage Vid. The first RS-FF circuit 74 cause the output signal S11 to trail after an elapse of the delay time DL1 in accordance with the first difference voltage V1 from the clock signal Mck. The second RS-FF circuit 75 causes the output signal S12 to rise after an elapse of the delay time DL2 in accordance with the second difference voltage V2 from the clock signal Mck.

The trailing timing of the signal S11 may be earlier than the timing when the signal S12 rises. When the delay time DL1 is shorter than the delay time DL2, the mask signal Smk is output. The trailing timing of the signal S11 may be later than the timing when the signal S12 rises. When the delay time DL1 is longer than the delay time DL2, the mode signal Smd is output.

When the division voltage Vid is higher than the reference voltage Vref, the mask signal Smk is output, and when the division voltage Vid is lower than the reference voltage Vref, the mode signal Smd is output. The reference voltage Vref may be a reference voltage for selecting one of the mask signal Smk and the mode signal Smd in accordance of the fluctuation of the input voltage Vin. The reference voltage may be set in accordance with the input voltage Vin and the output voltage Vout.

The mask signal Smk masks a part of the PWM control signal Spwm output from the PWM signal generation circuit 32 illustrated in FIG. 1. For example, as the on-time of the transistor 21 becomes shorter than the pulse width of the PWM control signal Spwm, the on-time may not depend on the response speed of the comparator 51 or the like. When the transistor 21 turns on, the state 3 is set. The state 3 may be finely controlled. When the input voltage Vin is higher than the output voltage, for example, in a case where Vin>>Vout is established, the above-mentioned operation may be effective.

When the input voltage Vin decreases to be close to the output voltage Vout, for example, when Vin>Vout is established, the influence from the response speed may be reduced. The mode signal Smd may finely control the time period of the state 1 and the time period of the state 2. As the mode signal Smd is activated, the boost mode and the buck mode are switched, and the efficiency of the switching supply circuit may be improved.

The reference voltage may be set so that when the input voltage Vin is higher than the output voltage Vout, the mask signal Smk is output, and when the input voltage Vin becomes close to the output voltage Vout, the mode signal Smd is output.

The reference voltage may be set so that when the input voltage Vin is higher than the output voltage Vout and the pulse width of the control signal Sp2 is shorter than the response speed of the comparator 51 or the like, the mask signal Smk is output instead of the mode signal Smd. The reference voltage may be set in accordance with the response speed of the circuit element for generating the PWM control signal Spwm.

The state control circuit 34 outputs one of the mask signal Smk and the mode signal Smd. The control signal generation circuit 35 illustrated in FIG. 5 generates the control signals Sd1 and Sd3 based on the signal Sp2 and the mode signal Smd. The signal Sp2 may be a PWM signal for setting the on/off time periods of the transistors 21 to 24 in accordance with the output voltage Vout.

When the mode signal Smd is at a high level, the OR circuit 93 outputs the control signal Sd1 at a high level. The AND circuit 94 outputs the control signal Sd3 based on the PWM signal Sp2. The transistors 21 and 22 illustrated in FIG. 1 are controlled based on the control signal Sd1, and the transistors 23 and 24 are controlled based on the control signal Sd3. The states of the transistors 21 to 24, for example, the state of the output circuit 11, may correspond to the boost mode.

When the mode signal Smd is at a low level, the OR circuit 93 outputs the control signal Sd1 based on the PWM signal Sp2. The AND circuit 94 outputs the control signal Sd3 at a low level. The transistors 21 and 22 illustrated in FIG. 1 are controlled based on the control signal Sd1, and the transistors 23 and 24 are controlled based on the control signal Sd3. The states of the transistors 21 to 24, for example, the state of the output circuit 11, may correspond to the buck mode.

The buck mode and the boost mode are switched based on the mode signal Smd. The mode signal Smd at a low level is set based on the clock signal Pck at a high level. For example, the buck mode is set. After an elapse of a time in accordance with the input voltage Vin, the mode signal Smd at a high level is set, for example, the boost mode is set.

With respect to the output signal Spwm at a low level output from the PWM signal generation circuit 32 illustrated in FIG. 1, the control signal Sd1 is set as the high level based on the mode signal Smd at a high level, and the fourth transistor 24 turns off. A state where the fourth transistor 24 turns off may correspond to the state 3.

The transistor 21 turns OFF based on the mask signal Smk in a period in accordance with the input voltage Vin from the clock signal Pck in order to reduce the influence from the response speed of the comparator 51 or the like. The mask signal Smk may be a signal for shortening a Ton time. In the buck mode, as the transistor 21 turns off, the transit from the state 3 to the state 2 is carried out.

The output circuit 11 transits from the state 2 to the state 3 based on the mode signal Smd. The output circuit 11 transits from the state 3 to the state 2 based on the mask signal Smk. In one cycle of the clock signal Pck, the state 2 and the state 3 may be alternately set twice. This operation is equivalent to the switching supply circuit that operates with a frequency twice as large as that of the clock signal Pck. As one of the mask signal Smk and the mode signal Smd is output, the malfunction of the switching supply circuit that operates based on the mask signal Smk and the mode signal Smd may be reduced.

Figure 14:
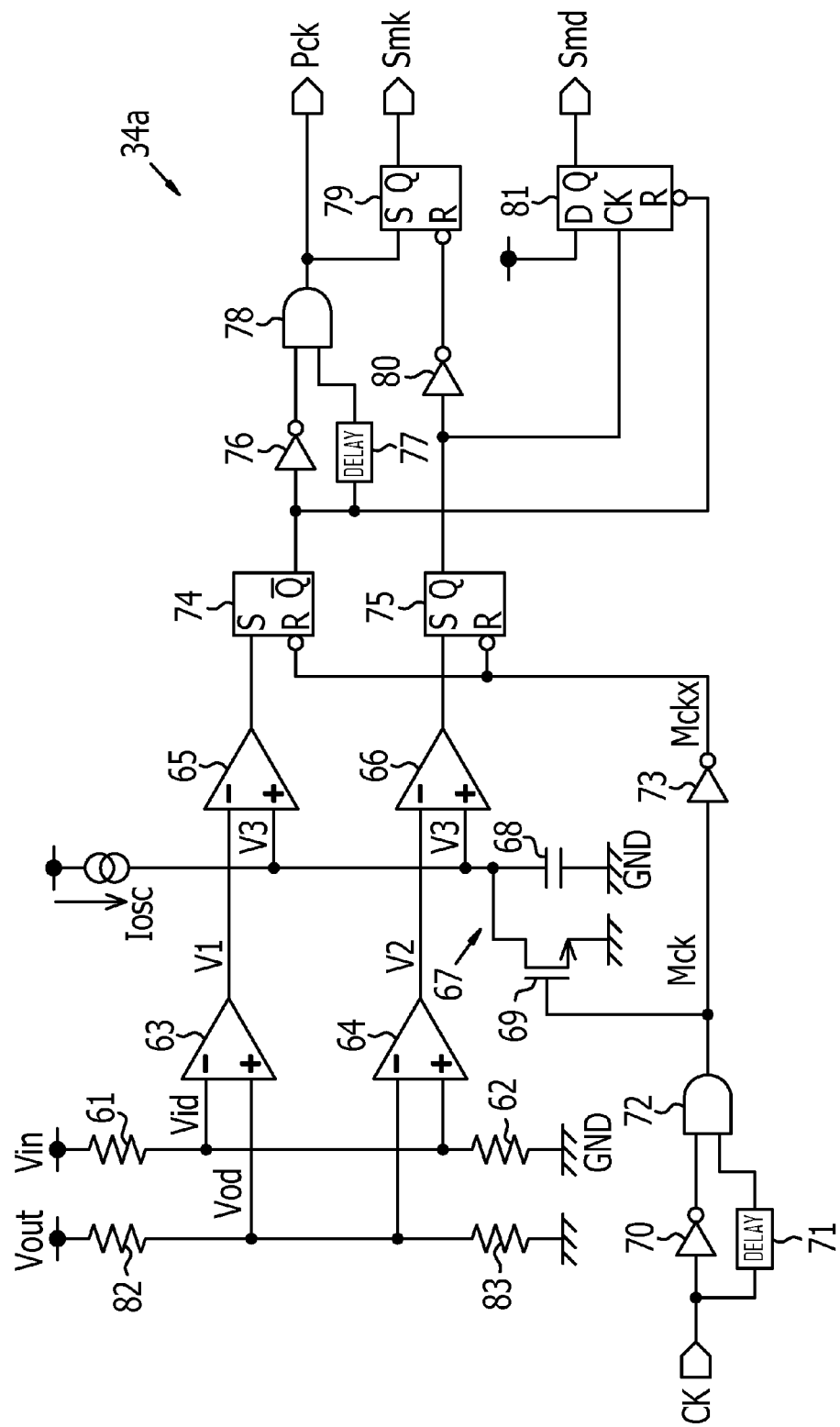
FIG. 14 illustrates an exemplary state control circuit.

The state control circuit 34 selects the mask signal Smk and the mode signal Smd based on the input voltage Vin and the reference voltage Vref. The mask signal Smk and the mode signal Smd may be generated based on the input voltage Vin and the output voltage Vout. FIG. 14 illustrates an exemplary state control circuit. The state control circuit 34a illustrated in FIG. 14 supplies the division voltage Vid, which is obtained by dividing the input voltage Vin at the resistance ratio of the resistors 61 and 62, and a division voltage Vod, which is obtained by dividing the output voltage Vout at a resistance ratio of resistors 82 and 83, to the amplifiers 63 and 64. The division voltage obtained by diving the input voltage Vin and the output voltage Vout may be supplied to the amplifiers 63 and 64.

A synchronous rectification system switching supply circuit or a non-synchronous rectification system switching supply circuit may be applied. For example, the transistor 22 illustrated in FIG. 1 may operate as a diode whose anode is coupled to the ground GND, and the transistor 24 may operate as a diode whose anode is coupled to the node N2. Diodes may be coupled instead of the transistors 22 and 24. The through current prevention circuit 36 may be deleted. The output signal Sd1 and the output signal Sd3 of the control signal generation circuit 35 may be supplied to the transistors 21 and 23 as the control signal.

The transistors 21 to 24 may be a MOS transistor, a bipolar transistor, or a Bi-CMOS transistor. The transistors 21 to 24 may be a P-channel MOS transistor. The transistors 21 to 24 may be an N-channel MOS transistor. Along with the change, the control unit 12, for example, the through current prevention circuit 36 or the like, may be changed.

The transistors 21 to 24 may be another switching element instead of the MOS transistor. The reference supply for generating the reference voltage supplied to the amplifier 43 illustrated in FIG. 1 may be different from the reference supply for generating the reference voltage supplied to the amplifiers 63 and 64 illustrated in FIG. 2. The reference voltage supplied to the amplifier 43 may be different from the reference voltage supplied to the amplifiers 63 and 64 illustrated in FIG. 2.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

The invention claimed is:

1. A control circuit for a switching supply, comprising:
   a first control circuit that outputs a first signal to switch a boost mode and a step-down mode and a second signal to control an on-period of a switch based on an input voltage, the switch provided between a terminal to which the input voltage is applied and an inductor; and
   a second control circuit that controls the switching supply based on an output voltage by performing a logical operation on the first signal and the second signal,
   wherein the first control circuit includes:
      a generation circuit that generates triangular wave;
      a plurality of amplifiers that amplify a difference voltage between the input voltage and a reference voltage; and
      a plurality of comparators, each of which compares an output of a respective amplifier of the plurality of amplifiers with an output of the generation circuit.

2. The control circuit according to claim 1, further comprising: an element that detects a fluctuation of the output voltage and the input voltage, wherein the first control circuit selects one of the first signal and the second signal based on a reference voltage corresponding to a response speed of the element.

3. The control circuit according to claim 2, wherein the first control circuit selects the second signal when the input voltage is higher than the reference voltage.

4. The control circuit according to claim 1, further comprising: an error signal generation circuit that outputs an error voltage in accordance with a difference between a reference voltage and a voltage in proportion to the output voltage; and a pulse-width modulation (PWM) signal generation circuit that changes a duty of a control signal output from the second control circuit based on the error voltage.

5. The control circuit according to claim 1, wherein the switching supply includes a step-down and boost power supply.

6. A switching supply comprising:
   a first switch provided between a first terminal of an inductor and an input terminal to which an input voltage is input;
   a second switch provided between the first terminal of the inductor and a ground terminal;
   a third switch provided between a second terminal of the inductor and the ground terminal;
   a fourth switch provided between the second terminal of the inductor and an output terminal from which an output voltage is output; and
   a control circuit that generates a control signal to control the first switch to the fourth switch, wherein the control circuit includes:
   a first control circuit that outputs a first signal to switch a boost mode and a step-down mode and a second signal to control an on-period of a switch based on the input voltage, the switch provided between the inductor and a terminal to which the input voltage is applied; and
   a second control circuit that controls the switching supply based on the output voltage by performing a logical operation on the first signal and the second signal,
   wherein the first control circuit includes:
      a generation circuit that generates triangular wave;
      a plurality of amplifiers that amplify a difference voltage between the input voltage and a reference voltage; and
      a plurality of comparators, each of which compares an output of a respective amplifier of the plurality of amplifiers with an output of the generation circuit.

7. The switching supply according to claim 6, wherein the switching supply includes a step-down and boost power supply.

8. A control method of a switching supply, the method comprising:
   generating triangular wave signal;
   amplifying a difference voltage between an input voltage and a reference voltage;
   comparing an amplified difference voltage with the triangular wave signal to generate a first signal to switch a boost mode and a step-down mode and a second signal to control an on-period of a switch, the switch provided between an inductor and a terminal to which the input voltage is applied; and
   controlling the switching supply based on an output voltage by performing a logical operation on the first signal and the second signal.

9. The control method according to claim 8, wherein the switching supply includes a step-down and boost power supply.

* * * * *